United States Patent [19]
Deacon

[11] 3,831,889
[45] Aug. 27, 1974

[54] AIRPORT RUNWAY CONSTRUCTION

[76] Inventor: John H. Deacon, 23 Barduas Ct., Kanata, Ontario, Canada

[22] Filed: June 21, 1973

[21] Appl. No.: 372,186

[52] U.S. Cl. .............................................. 244/114
[51] Int. Cl. ............................................ B64f 1/100
[58] Field of Search.... 244/114 R, 115, 116, 110 R, 244/110 F, 110 C; 114/43.5, 43.5 S, 74 R, 125; 404/1, 27; 14/1; 252/70; 104/280

[56] References Cited
UNITED STATES PATENTS

| | | | |
|---|---|---|---|
| 1,914,573 | 6/1933 | Kookogey | 244/114 R |
| 3,128,066 | 10/1960 | Bailey | 244/114 R |
| 3,142,460 | 7/1964 | Langford | 244/114 R |
| 3,356,251 | 1/1965 | Roberts | 114/74 R |

FOREIGN PATENTS OR APPLICATIONS

| | | | |
|---|---|---|---|
| 1,049,955 | 1/1954 | France | 244/114 R |
| 125,270 | 6/1949 | Sweden | 244/114 R |
| 1,277,034 | 9/1968 | Germany | 244/110 C |
| 502,518 | 5/1954 | Canada | 244/114 R |

Primary Examiner—Robert J. Spar
Assistant Examiner—G. L. Auton
Attorney, Agent, or Firm—John E. Becker

[57] ABSTRACT

An airport runway has a grid structure for supporting aircraft during take-off and landing. The grid structure extends over a liquid reservoir and comprises bars defining therebetween spacings extending downwardly through the grid structure and in open communication with the reservoir, which has means, e.g. expansible chambers, for raising the level of liquid in the reservoir through and above the grid structure to remove snow and ice from the latter. Barriers around, and above the level of, the grid structure confine the liquid.

9 Claims, 7 Drawing Figures

AIRPORT RUNWAY CONSTRUCTION

This invention is concerned with the design and construction of aircraft landing and take-off runways, and is applicable to airport runways suitable for, but not necessarily limited to, use by STOL-type (Short Take Off and Landing) airplanes.

The increase in aircraft congestion and the advent of large, high-speed, jet-powered aircraft which are economical to operate only over long distances and which require expensive airport facilities has made the use of aircraft with STOL capabilities, flying relatively short routes and able to land close to the desired destination (particularly in major urban areas), increasingly attractive. Development is proceeding on more versatile and quieter aircraft with augmented STOL capabilities, and proposals have been put forward for networks of STOL routes and associated STOL-ports in Canada, the United States and other countries. The proposed construction of airports specifically designed for use by STOL aircraft and located close to the centre of urban areas has stimulated consideration of the several features which such airports should possess to make them practical, economically viable, and useable under a variety of conditions.

At least as early as 1949, designs for airport runways incorporating unique features were proposed, even though the concept of STOL-ports had not taken serious form. U.S. Pat. No. 2,466,150, issued Apr. 5, 1949 to R. C. Burt, discloses the concept of shallow pools of water located on the runway surface. The pools disclosed therein are located at the leeward end of the runway so that the water acts as a lubricant between the runway and the wheels of the aircraft when it is touching down. U.S. Pat. No. 3,066,896 issued Dec. 4, 1962 to J. F. Schurtzinger, proposes the use of shallow pools of liquid at the windward end of a runway to act as a decelerating aid. In U.S. Pat. No. 3,142,460 issued July 28, 1964, D. C. Langford shows the use of inflatable or movable dikes to confine shallow pools of water on sections of an airport runway; the pools of water acting as both a means to reduce the friction between aircraft tires and the airstrip upon initial touchdown, and as an aircraft brake for decelerating a rolling aircraft.

STOL aircraft rely upon critical performance factors to achieve short landing rolls and take-off runs. The performance capabilities of the aircraft require precise control of the aircraft systems by a well-qualified and capable crew in order to achieve safe operation. It is desirable that an airstrip specifically designed for use by STOL airplanes have safety and performance characteristics which augment and complement the aircrafts' capabilities, and which assist in achieving safe consistent operation under diverse weather conditions and environmental situations.

Because a STOL aircraft's major advantage is a capability to land and to lift off in a short distance, braking ability and rolling resistance become critical performance factors which must be of a consistent value. Accordingly, a STOL-port should be able to guarantee these physical properties within acceptable limits despite adverse weather conditions. It also is advisable that a STOL-port possess arresting mechanisms which can bring an aircraft to a safe stop without it leaving the airport boundaries and with a minimum of damage, should failure or error cause an overshoot on landing or an aborted take-off. Under the maximum performance conditions of a STOL aircraft touchdown or take-off, it also is advantageous if the runway provides additional directional stability over and above the steering mechanisms of the airplane itself. In incorporating these features, the runway surface also should be capable of being easily and quickly cleaned of precipitation such as rain, snow or ice and of contamination such as fuel and dirt, so as to ensure consistent reliability of aircraft operations.

It is an object of this invention to improve upon the all-weather operational capability of airport runways by providing runways which are useable under most adverse weather conditions, but not necessarily in all kinds of weather. The runways of this invention may also incorporate other features and advantages which make them significantly acceptable, particularly for use by STOL aircraft. In addition, present runways may be located at ground level in the normal manner, or may be utilized at elevated STOL-ports, specifically designed for use by aircraft having STOL capabilities, or on aircraft carriers.

According to the present invention, an aircraft runway comprises a grid structure forming a runway portion on which aircraft travel during take-off and landing. The grid structure extends over a liquid reservoir and is formed by bars having spacing therebetween which extend through the grid structure and are in open communication with the underlying reservoir. Means are provided for raising the level of liquid in the reservoir through the grid structure to remove snow and ice from the latter. Barriers around, and above the level of the grid structure, confine the liquid.

With this construction, the grid structure can be flooded when required to clean the grid structure and maintain a relatively constant co-efficient of friction between the grid structure and aircraft wheels.

In a preferred embodiment of the invention, the grid structure is formed unevenly, e.g. by being serrated or formed with raised ribs, to improve the ability of the aircraft wheels to grip the runway.

Further features, objects and advantages of the present invention will be more readily understood from the following description of an embodiment thereof, given by way of example with reference to the accompanying drawings, in which.

Figure 7:
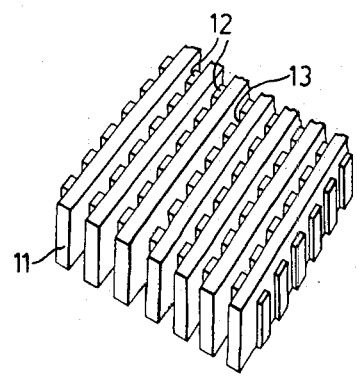
FIG. 7 shows a broken-away view taken in perspective of a portion of the aircraft support structure forming part of the aircraft runway construction of FIG. 1.

As shown in the drawings, the aircraft runway construction comprises an aircraft support structure indicated generally by reference numeral 10, which is in the form of a grid having a plurality of bars 11 (FIG. 7) extending longitudinally of the runway and spaced apart by spacer members 12, openings 13 being formed between the bars 11 and the spacers 12.

The aircraft support structure 10 is supported on foundations 15 (FIGS. 2 and 3) above a body of liquid 16 disposed in a reservoir, indicated generally by reference numeral 17, extending below the aircraft support structure 10.

Preferably, the aircraft support structure 10 is composed of removable sections of the grid, preferably made from a non-sparking material. It is advantageous to make the sections easily removable so that maintenance, repair or replacement may be readily effected.

A liquid circulation system (not shown) causes the liquid 16 to circulate beneath the aircraft support structure for removal of atmospheric precipitation, and preferably incorporates means which can continuously filter the liquid to remove contaminants such as fuel or oil and debris such as dust, earth and leaves.

In addition, the level of the body of the liquid 16 can be raised, by means of one or more expansible chambers 14 (FIG. 3) provided in a recess 22 in the side wall of the reservoir 17, to bring this level above the upper surface of the aircraft support structure 10. The chamber 14 is inflatable by an air pump (not shown) into the shape shown in broken lines in FIG. 3 and indicated by reference numeral 14a.

In normal operation, aircraft which usually have similar external tire materials encounter large variances in the coefficient of friction provided by the variety of runway surfaces used, and this is compounded by differing weather conditions, types of precipitation, and contaminants. The coefficient of friction can be changed substantially by precipitation including rain, ice and snow, and contaminants such as fuel or oil. Extremely hazardous landing and take-off conditions result. For example, in the case of rain, pools of water formed on the runway can cause complete loss of directional control due to aquaplaning. In the case of snow or slush on the surface, the resultant drag on an aircraft's undercarriage can prevent acceleration to take-off speed. The Ministry of Transport in Canada is now providing, at some airports as part of the standard sequence of weather information, a braking ability index which takes into consideration the coefficient of friction. Although the grid-type landing and take-off surface of the present runway construction may be utilized when dry, it is contemplated that the grid will be operated in a wet condition (resulting from periodic circulation of and flooding with the liquid normally contained beneath the grill work), and that the grid with a roughened surface and possibly in combination with a particular tire design will provide an adequate and consistent coefficient of friction. In many instances of atmospheric precipitation, the circulating liquid beneath the grid will provide continuous removal of the precipitation with only an occasional requirement to raise the liquid level above the top surface of the grid for complete cleaning. Aircraft landing and take-off would be suspended briefly during the brief periods that the fluid is above the grid.

In order to contain the liquid when it is raised above the grid surface, a liquid-retaining barrier surrounding the runway is provided. The barrier may be provided, e.g., by depression of the actual runway surface below the normal surface of the surrounding ground or structure, but in the present embodiment is formed by side walls 18, e.g., in the form of inflatable dikes, extending around the top of the aircraft support structure 10.

Figure 4:
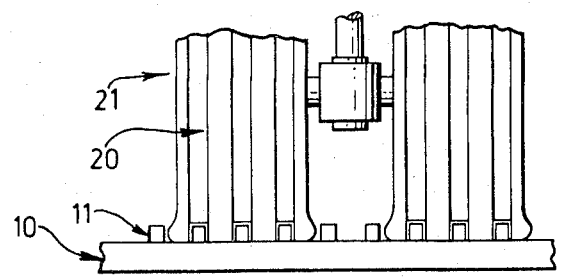
FIG. 4 shows on a larger scale a broken-away view of aircraft wheels in engagement with the aircraft runway construction of FIG. 1.

To assist the pilot of an aircraft in maintaining directional control, the longitudinal bars 11 forming the runway grid surface can be spaced and be of a width to match grooves 20 (FIG. 4) in ribbed aircraft tires 21. The grooves and ribs of the tires 20 and the aircraft support structure 10 are specifically designed to interengage with each other so as to assist in lateral control of the aircraft during take-offs and landings, particularly those undertaken with a crosswind not directly down the runway.

The bars 11 are provided with an uneven, serrated upper surface on the bars 11 so as to give maximum friction and stability, particularly during heavy braking action. In certain installations, those portions of the runway adjacent to the longitudinal edges thereof could be devoid of serrations or made less rough. In this way, if the brakes were applied on an aircraft rolling along the runway grid adjacent to the edge, the decreased drag on the wheels near the edge of the runway would tend to direct the aircraft back toward the centre. While the upper surface is serrated to provide a sufficient tire-runway coefficient of friction, the aircraft support structure 10 should be designed to cooperate with the aircraft tires and tire pressures to give a minimum of rolling resistance, particularly for take-off runs. It also is possible to slope the surface of the runway grid slightly upward laterally from the longitudinal centre line to provide additional centering action to aircraft operating on the runway.

As an additional safety feature, it is desirable to provide the airstrip with pools 23 of liquid at each end which become increasingly deeper as the distance to the end of the airstrip decreases. This can be accomplished by downwardly pivoting end portions 10a of the bars 10 forming the runway surface, as shown at the left-hand end of the runway as viewed in FIGS. 1 and 2.

Identical deceleration pools 23 are provided at both ends of the runway, although only the one at the appropriate end would be used at any one time, depending on the direction of take-off and landing, which is of course dependent on the wind direction and is indicated by arrow A.

Figure 1:
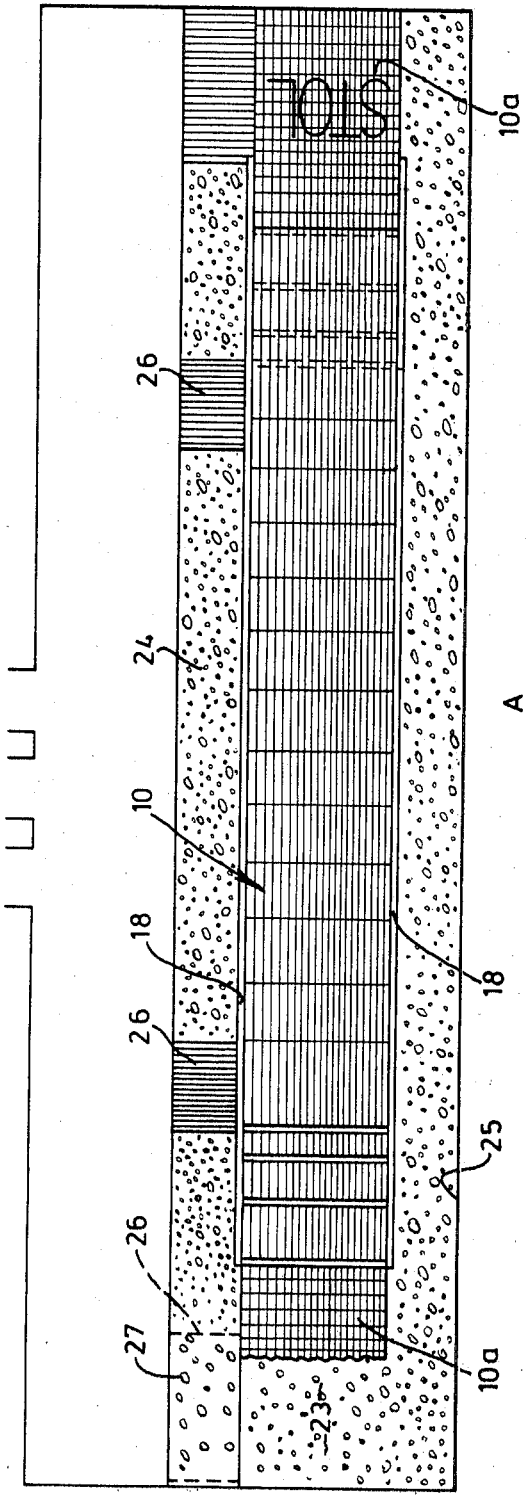
FIG. 1 shows a plan view of an aircraft runway construction.
Figure 2:
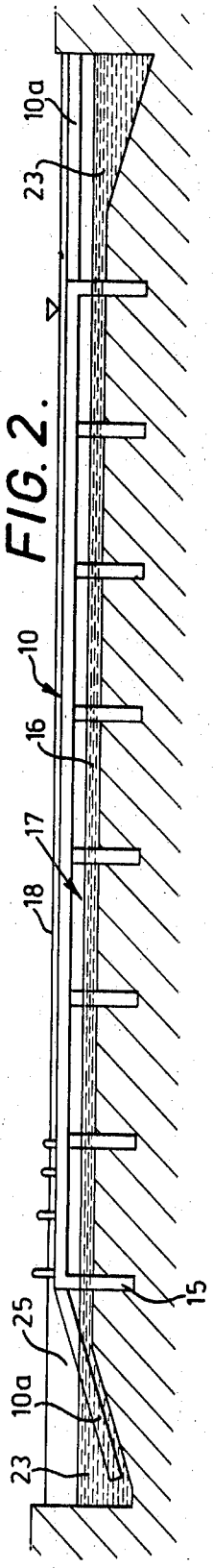
FIG. 2 shows a view taken in vertical section along the line II—II through the aircraft runway construction of FIG. 1.
Figure 3:
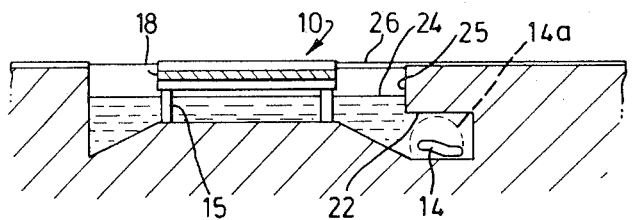
FIG. 3 shows a view taken in vertical section along the line III—III through the aircraft runway construction of FIG. 1.

The end portions 10a can be raised to provide a level extension forming part of the runway at the approach and take-off end opposite the windward end, i.e., the right-hand end as viewed in FIGS. 1 and 2.

It is possible that an aircraft upon entering the pool 23 might tend to "plane" on the surface of the liquid and overshoot the pool 23, particularly in the case of a belly landing or collapse of the undercarriage. It is advisable, therefore, particularly in the case of an elevated STOL-port, to provide a barrier beyond the end of the moat. This barrier could be deformable, crushable or inflatable construction which would receive the moving aircraft and cause rapid deceleration, with consequent damage to the aircraft structure. As a further precaution, a permanent net could be erected beyond the retaining wall to catch and enmesh the aircraft if it passed through the barrier and walls.

Figure 5:
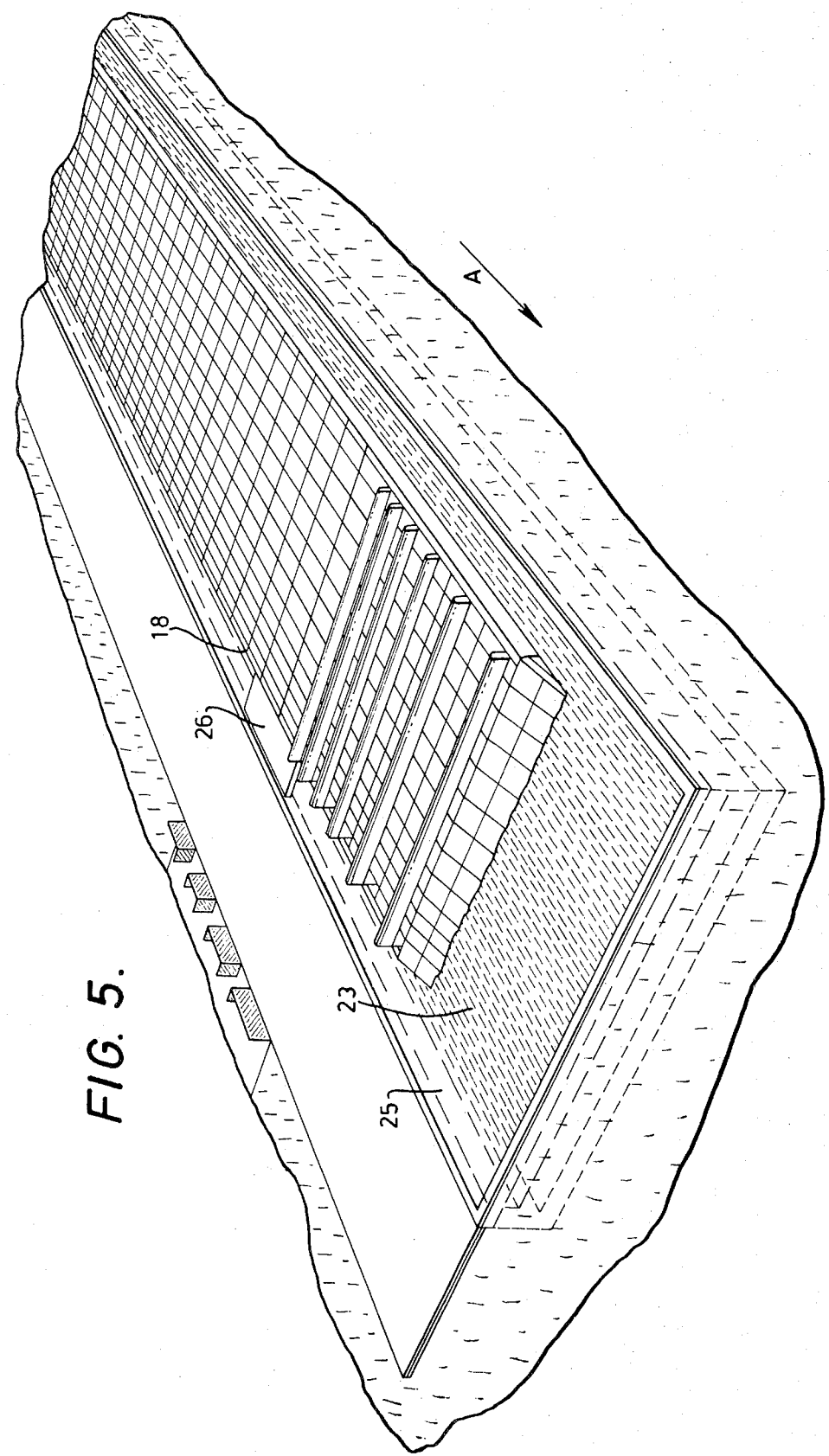
FIG. 5 shows a view taken in perspective of the aircraft runway construction of FIG. 1.

In the present embodiment of the invention, the pools 23 are contiguous with the reservoir 17 and with moats 24 extending along the sides of the aircraft support structure 10, the pools 23 and the moats 24 being surrounded by a wall 25 (FIG. 5). The bottoms of the moats 24 slope down and away from the aircraft support structure 10 to the liquid-retaining wall 25. The purpose of the moats along the sides of the runway is to arrest an aircraft that has veered off the side of the aircraft support structure. It is anticipated that the lateral component of an aircraft's motion likely will not be as great as the forward component, and that, therefore, the moats along the sides of the runway can be narrower than the pools at the ends. It would be advantageous also to provide the liquid-retaining wall 25 with an inner deformable crushable or inflatable barrier to cushion any impact of an aircraft that possibly transverses the moat. Of course, it also is possible to provide nets along the outer sides of the retaining wall similar to those nets which may, as mentioned above, be provided at the ends of the airstrip. To enable aircraft to taxi to and from the runway over one of the moats 24, it is necessary to position bridges 26 across this moat. These bridges 26 are sections of grating which can be raised level with the surface of the aircraft support structure 10 to allow an airplane to taxi to or from the airstrip, and then if desired lowered for take-offs or landings.

All liquid used on the runway and in the deceleration pools and moats preferably should be of similar composition, able to remain fluid in water-freezing temperatures, and miscible with atmospheric precipitation. The fluid should have the ability to dissolve or be miscible with fuels and oils to facilitate their removal from the runway. The liquid would be pumped over the runway gratings as required to clean the surface and to provide a relatively consistent coefficient of friction. In many instances of atmospheric precipitation, the level of the circulating liquid could be kept just below the top of the runway grid, providing continuous removal of precipitation without the necessity of cleaning the grid. The liquid in the pools and moats would be raised and lowered as desired to supply suitable aircraft decelerations, and also would be heated and filtered when necessary. Filtering the liquid to remove debris, water, fuel, oil and other contaminants would ensure a continuous supply of clean fluid for supply to the runway surface. It is advantageous to have pumping circuits for the airstrip separate from pumping circuits for the moats and pools, so that liquid of a higher temperature can be supplied to the runway for de-icing and grid-cleaning purposes. One obvious choice as a liquid suitable for use in the practice of this invention is water although other substances undoubtedly would be mixed with the water as additives to prevent freezing, as miscible solvents for cleaning, and for other purposes.

Figure 6:
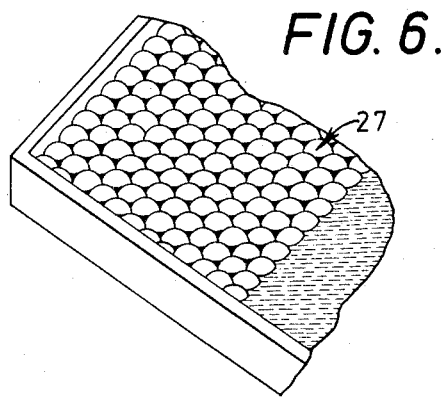
FIG. 6 shows a view taken in perspective of a portion of the aircraft runway construction of FIG. 1.

In order to reduce any tendency for the liquid in the moats to evaporate, the surface of the liquid is provided with anti-evaporation devices such as a layer of floating plastic balls 27, as shown in FIG. 6, or other objects, or chemicals. It also is advisable that any reflection and glare from the liquid surface which might be produced under certain light conditions be kept to a minimum. Objects floating on the surface could reduce reflection or alternatively other means may be employed.

An additional feature which can be used to advantage in the practice of this invention is the inclusion of special fire-fighting chemicals in the liquid or alternatively the utilization of a liquid which is itself a fire retardant. The liquid level could be raised to aid in extinguishing a blaze, or fire trucks with high capacity pumps would have a readily available and closely adjacent source of liquid to pour onto a burning aircraft, other vehicle or structure. If desired, a separate system of piping to supply special fire-fighting chemicals into or around the liquid at separate sections of the airstrip also can be provided.

In addition to supplying fire-fighting chemicals to the liquid surrounding and extending underneath the way grid aircraft support structure, it also may be advantageous (particularly in airport locations susceptible to the presence of fog) to supply fog-dispensing chemicals to the liquid. Alternatively, or additionally, the liquid could be heated so as to heat the air immediately above the runway thus encouraging fog to disperse.

This liquid performs a cleaning function, retards aircraft which penetrate the pools or moats, and removes flammable substances, atmospheric precipation, and debris on the active surface. The liquid preferably should not easily evaporate so that it can be heated to aid in fog dispersal, should be non-flammable, non-toxic and non-corrosive. The liquid should be able to perform all its functions throughout the range of temperature and atmospheric conditions expected at the airport. It also would be wise to have it unattractive to birds so as to discourage their congregation near the runway.

It will be clear from a consideration of the preceding, that the present invention provides an aircraft runway construction offering several unique features and advantages which emphasize safe operation and adverse weather capability. The design incorporates positive aircraft retardation capabilities which do not depend upon installation or operation of systems or components in the aircraft themselves. The landing surface can contribute to lateral control of an airplane landing or taking off, and to supply of fire-fighting materials. Positive means are provided for the removal of contaminants, debris and atmospheric precipitation from the runway surface, and a fog discouraging capability can be incorporates

I claim:

1. An aircraft runway, comprising
    an open-topped liquid reservoir;
    a grid structure extending over at least a portion of said reservoir for supporting aircraft above said reservoir during landing and take-off;
    said grid structure comprising spaced bars defining therebetween spacings extending downwardly through the grid structure and in open communication with said reservoir;
    a supply of liquid in said reservoir;
    liquid displacement means for raising the level of said liquid in said reservoir through and above the level of said grid structure, whereby said grid structure may be flooded to remove snow and ice therefrom; and
    liquid-retaining barrier means extending around, and above the level of said grid structure for confining the liquid in said reservoir;
    a moat-defining structure extending around at least three sides of said grid structure defining the lateral boundaries of said reservoir;
    and a bridge movable to a position extending across said moat defining structure to enable aircraft to taxi to and from said grid structure.

2. An aircraft runway as defined in claim 1, wherein said liquid displacement means comprise expansible chambers and means for expanding said expansible chambers to thereby effect the raising of the level of the liquid in said liquid reservoir.

3. An aircraft runway as defined in claim 1, wherein said bars extend longitudinally of said runway and said bars and said spacings are selectively dimensioned for interengagement with peripheral grooves and ribs on aircraft tires.

4. An aircraft runway as defined in claim 1, wherein said grid structure is formed unevenly to promote frictional engagement of said runway surface portions with aircraft wheels.

5. An aircraft runway as defined in claim 1, further comprising a pool-defining structure at at least one end of said runway for containing a pool of liquid for decelerating overrunning aircraft.

6. An aircraft runway as defined in claim 5 wherein said pool-defining structure has a base downwardly inclined away from said aircraft support structure.

7. An aircraft runway as defined in claim 1, and further comprising a plurality of floats in said moat-defining structure.

8. An aircraft runway as defined in claim 1, wherein said liquid is miscible with atmospheric precipitation, non-inflammable non-toxic and non-corrosive.

9. An aircraft runway as defined in claim 8, wherein said liquid contains fire-retardant chemicals.

* * * * *